United States Patent

Fukano et al.

[11] Patent Number: 5,586,570
[45] Date of Patent: Dec. 24, 1996

[54] DIRECTIONAL CONTROL VALVE

[75] Inventors: Yoshihiro Fukano; Yoshitada Doi, both of Ibaraki-ken, Japan

[73] Assignee: SMC Kabushiki Kaisha, Tokyo, Japan

[21] Appl. No.: 553,553

[22] PCT Filed: Apr. 18, 1994

[86] PCT No.: PCT/JP94/00640

§ 371 Date: Dec. 18, 1995

§ 102(e) Date: Dec. 18, 1995

[87] PCT Pub. No.: WO95/28591

PCT Pub. Date: Oct. 26, 1995

[51] Int. Cl.⁶ .............................. F15B 13/02; F16K 27/00
[52] U.S. Cl. ................ 137/271; 137/596.16; 137/625.69; 137/884
[58] Field of Search ........................... 137/271, 596.16, 137/625.69, 884

[56] References Cited

U.S. PATENT DOCUMENTS 2,834,368  5/1958  Gray ........................................ 137/271
3,550,621 12/1970  Lansky et al. ........................... 137/884
4,224,957  9/1980  Darves et al. ....................... 137/884 X
5,462,087 10/1995  Fukano et al.

*Primary Examiner*—Gerald A. Michalsky
*Attorney, Agent, or Firm*—Oblon, Spivak, McClelland, Maier & Neustadt, P.C.

[57] ABSTRACT

A directional control valve has a supply port, first output ports and discharge ports which are open at a lower surface of a valve body at positions for communication with corresponding openings in a manifold base. The lower surface of the valve body has attachments for attaching a blanking plate which can close all the above ports. The valve body has a supply passage and discharge passages defined therethrough in the direction in which directional control valves are arrayed, and held in communication with the corresponding ports. Second output ports are defined in an upper surface of the valve body in communication with the first output ports. With the blanking plate detached from or attached to the same valve body, directional control valves may be arrayed through the manifold base or directly on a rail.

10 Claims, 3 Drawing Sheets

DIRECTIONAL CONTROL VALVE

BACKGROUND OF THE INVENTION

1. Field of the Invention

The present invention relates to a directional control valve which allows a plurality of such directional control valves to be arrayed through manifold bases or directly on a rail.

2. Discussion of the Background

It has heretofore been practiced to array a plurality of directional control valves in a given direction and control the arrayed directional control valves in a centralized manner. For example, manifold bases are coupled respectively to directional control valves, and supported on an elongate rail for thereby arraying the directional control valves. Alternatively, a plurality of directional control valves are mounted directly on an elongate rail so as to be arrayed in the longitudinal direction of the rail.

If the plurality of directional control valves are arrayed on the rail through the manifold bases, then supply, output, and discharge ports for a fluid under pressure are defined in lower surfaces of valve bodies of the directional control valves in positions where they can communicate with corresponding openings in the manifold bases. For directly outputting the fluid under pressure from the directional control valves, the output ports are defined in upper surfaces of the valve bodies.

If the plurality of directional control valves are arrayed directly on the rail, then supply and discharge passages for a fluid under pressure are defined in the valve bodies, the supply and discharge passages extending through the valve bodies in the direction in which the valve bodies are arrayed (in the longitudinal direction of the rail). Supply and discharge ports communicating respectively with the supply and discharge passages are defined in lower surfaces of the valve bodies, and output ports are defined in upper surfaces of the valve bodies.

Even though the directional control valves have the same size and their valve body actuating means are the same as each other, their valve bodies have different structures depending on the location of the output ports, etc. for the array of directional control valves on the rail through the manifold bases and the array of directional control valves directly on the rail. Consequently, a plurality of types of valve bodies have to be made available in order to meet different arrays of directional control valves, which is not economical.

SUMMARY OF THE INVENTION

The present invention has been made in order to overcome the above difficulties. It is an object of the present invention to provide a directional control valve having a valve body which allows a plurality of such directional control valves to be arrayed through manifold bases or directly on a rail, for thereby reducing a valve manufacturing cost and also reducing the number of parts of the valve to facilitate valve inventory control.

With a directional control valve according to the present invention, when a valve body is mounted on a manifold base, supply, first output, and discharge ports which are open at a first side surface of the valve body communicate respectively with corresponding openings in the manifold base.

If opposite ends of supply and discharge passages and a second output port which are defined in the valve body and extending therethrough in the direction in which directional control valves are arrayed, are closed by a suitable means, then a fluid under pressure can be supplied and discharged from the manifold base.

If the first output port is closed by a suitable means, then a fluid under pressure can be outputted from the second output port which is open at a second side surface of the valve body.

If a blanking plate is attached to the first side surface of the valve body through an attachment means, then since all the supply, first output, and discharge ports are closed, a fluid pressure is supplied and discharged from the supply and discharge passages in the valve body to the supply and discharge ports, and drawn from the second output port.

Therefore, the same valve body allows a plurality of directional control valves to be arrayed on a rail either through the manifold bases or directly.

DETAILED DESCRIPTION OF THE PREFERRED EMBODIMENTS

The present invention will be described in detail with reference to the accompanying drawings.

Figure 1:
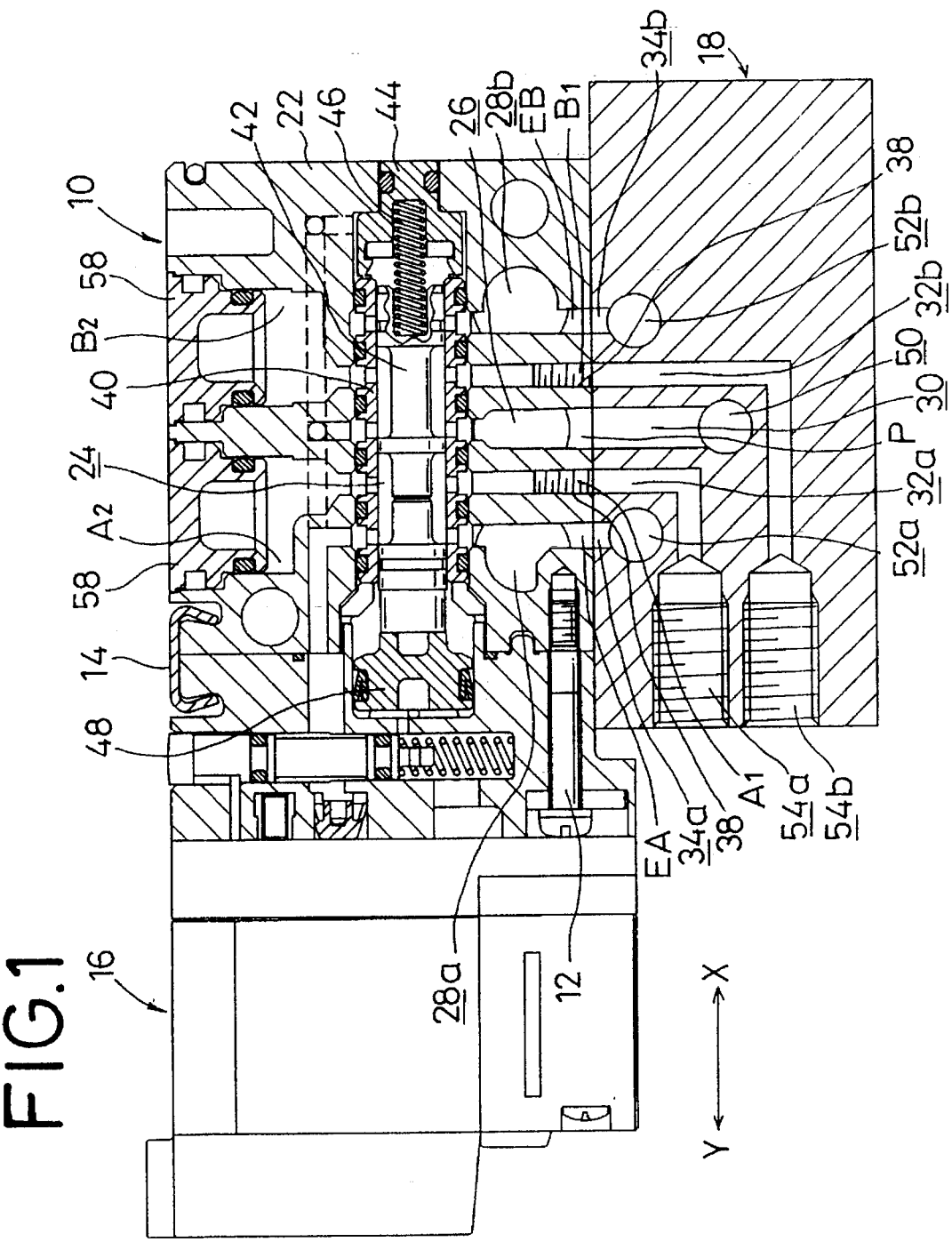
FIG. 1 is a longitudinal cross-sectional view of a directional control valve according to the present invention, which is mounted on a manifold base.

FIG. 1 shows in longitudinal cross section a directional control valve 10 according to an embodiment of the present invention, a solenoid-operated pilot valve 16 coupled to the directional control valve 10 by a bolt 12 and a coupling member 14, and a manifold base 18 coupled to a lower surface of the directional control valve 10. The directional control valve 10 can be mounted on the manifold base 18 or directly on a rail 20 (see FIG. 3).

The manifold base 18 may comprise a plurality of manifold bases 18 in the form of a plurality of separate blocks of substantially the same shape which are aligned with the respective directional control valves 10. The manifold bases 18 thus coupled to the respective directional control valves 10 are supported on the rail 20 which is elongate, thereby arranging the directional control valves 10 in an array. Alternatively, the directional control valves 10 may be mounted in an array on an elongate unitary manifold base 18.

Figure 2:
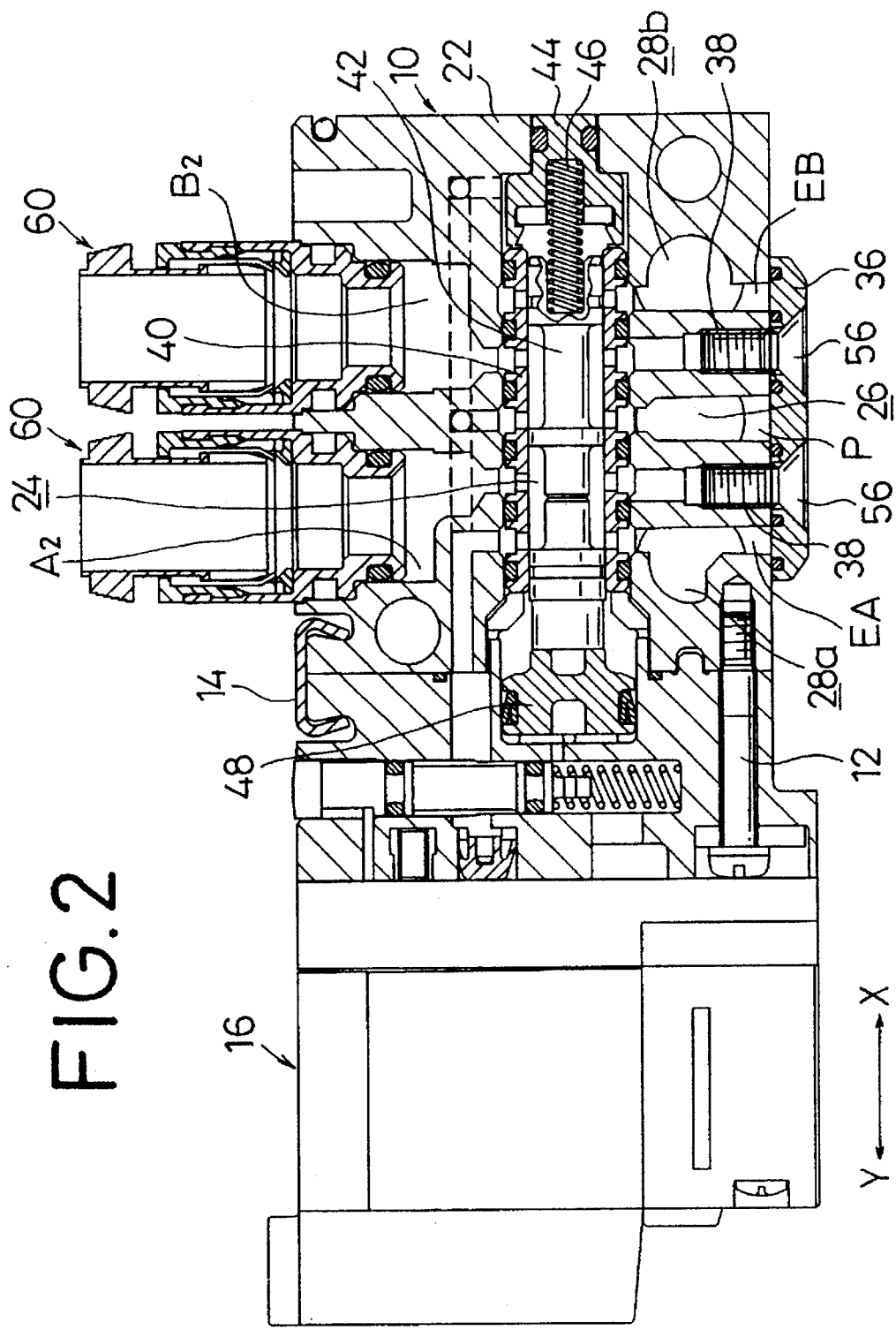
FIG. 2 is a longitudinal cross-sectional view of the directional control valve shown in FIG. 1, with a blanking plate attached thereto.

As shown in FIG. 2, each of the directional control valves 10 comprises a valve body 22 having a supply port P, first output ports $A_1$, $B_1$ and second output ports $A_2$, $B_2$ (valve output ports) defined in the valve body 14 in confronting relation to each other, discharge ports EA, EB, a valve hole 24 communicating with the supply port P, the first output ports $A_1$, $B_1$, the second output ports $A_2$, $B_2$, and the discharge ports EA, EB, and extending axially in the valve body 22, and a supply passage 26 and discharge passages 28a, 28b which extend through the valve body 22 in the direction in which the directional control valves 10 are arrayed.

The supply port P, the first output ports $A_1$, $B_1$, and the discharge ports EA, EB are open at a lower surface (first side surface) of the valve body 22 in respective positions for communication with a supply opening 30, output openings 32a, 32b, and discharge openings 34a, 34b in the manifold base 18. The second output ports $A_2$, $B_2$ are open at an upper surface (second side surface) of the valve body 22. The supply passage 26 communicates with the supply port P, and the discharge passages 28a, 28b communicate respectively with the discharge ports EA, EB. The first output ports $A_1$, $B_1$ have respective openings that are internally threaded for use as attachments 38 for a blanking plate 36 (described later on).

A sleeve 40 inserted in the valve hole 24 has openings individually communicating with the respective ports described above. A spool valve 42 disposed for sliding movement in the sleeve 40 is selectively movable under a suitable control force, e.g., a pilot fluid pressure supplied from the solenoid-operated pilot valve 16, into a first position in which the supply port P and the output ports $A_1$, $A_2$ communicate with each other and the output ports $B_1$, $B_2$ and the discharge port EB communicate with each other, and under a resilient force of a return spring 46 held by a holder 44 into a second position in which the supply port P and the output ports $B_1$, $B_2$ communicate with each other and the output ports $A_1$, $A_2$ and the discharge port EA communicate with each other.

Specifically, when the solenoid-operated pilot valve 16 is actuated to supply the pilot fluid pressure, a pilot valve 48 is displaced in the direction indicated by the arrow X, displacing the spool valve 42 in the direction indicated by the arrow X into the first position under the pressure from the pilot valve 48 which overcomes the resilient force of the return spring 46. Under normal conditions, the spool valve 26 is pushed in the direction indicated by the arrow Y into the second position shown in FIG. 1 under the resiliency of the return spring 46.

The directional control valve 10 may comprise a three-port valve or a four-port valve, and the spool valve 42 may be operated under forces other than the pilot fluid pressure.

The supply opening 30 and discharge openings 34a, 34b in the manifold base 11 communicate respectively with a supply flow passage 50 and discharge flow passages 52a, 52b which extend through the manifold base 11 in the direction in which the manifold bases 11 are arrayed. The output openings 32a, 32b communicate respectively with output ports 54a, 54b that are open at a front surface of the manifold base 11.

Figure 3:
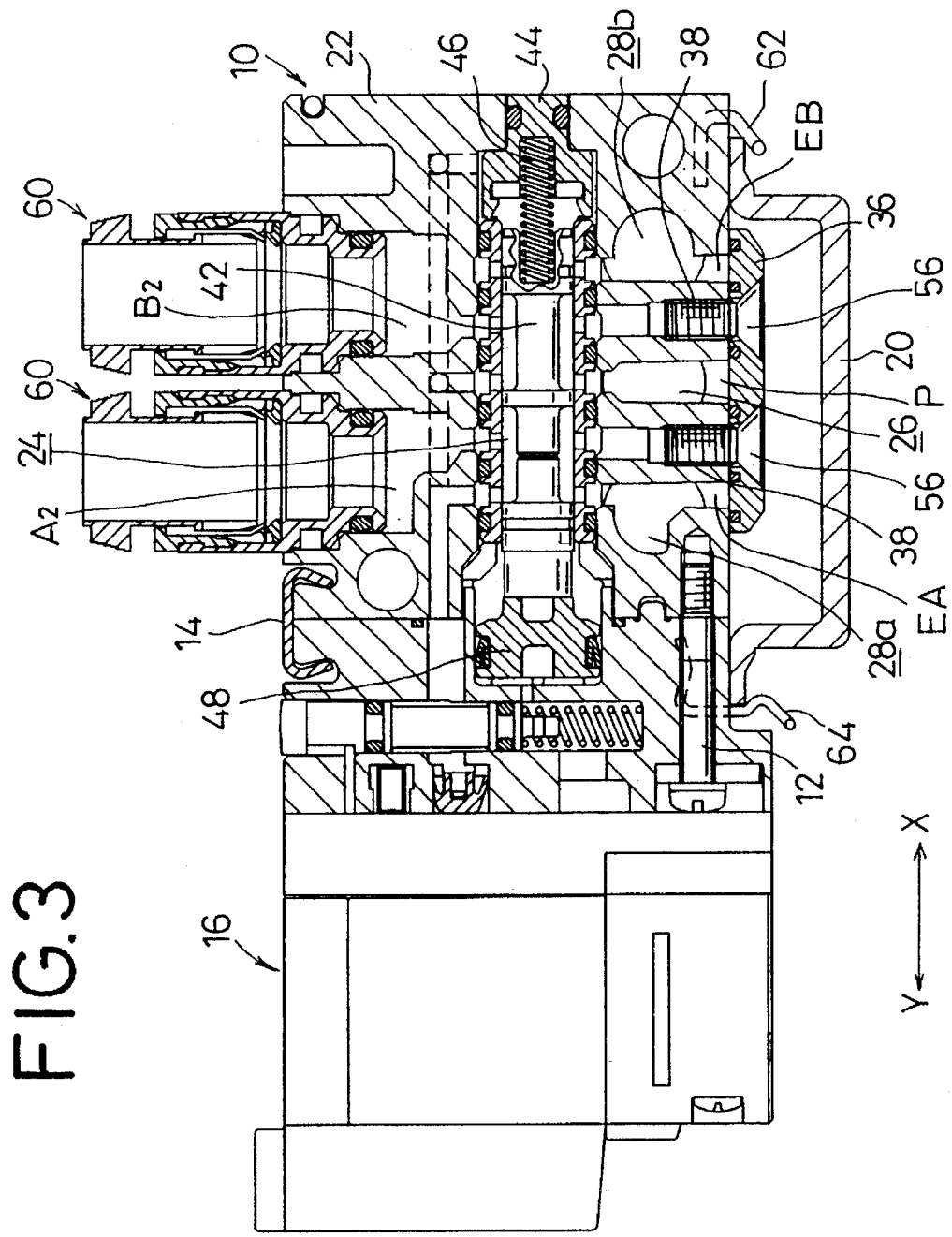
FIG. 3 is a longitudinal cross-sectional view of the directional control valve shown in FIG. 1, which is mounted directly on a rail.

The blanking plate 36 has a size that can be mounted between an upper surface of the rail 20 and a lower surface of the valve body 22 (see FIG. 3). When the blanking plate 36 is fastened to the attachments 38 in the lower surface of the valve body 22 by attachment screws 56, the blanking plate 36 closes all the supply port P, the first output ports $A_1$, $B_1$, and the discharge ports EA, EB (see FIG. 2). The reference numeral 58 in FIG. 1 designates plugs which close the second output ports $A_2$, $B_2$, respectively. The reference numeral 60 in FIGS. 2 and 3 designates quick-connect-and-disconnect pipe couplings mounted in the second output ports $A_2$, $B_2$ for connection of tubes (not shown).

Operation and advantages of the directional control valve 10 according to the embodiment of the present invention, which is basically constructed as described above, will be described below. A plurality of directional control valves 10 are similarly arrayed on the manifold bases 18 or the rail 20. However, one directional control valve 10 will be described as being installed.

First, an application in which the directional control valve 10 is coupled to the manifold base 18 as shown in FIG. 1 will be described below.

When the directional control valve 10 is mounted on the manifold base 18, the supply port P, the first output ports $A_1$, $B_1$, and the discharge ports EA, EB communicate respectively with the supply opening 30, the output openings 32a, 32b, and the discharge openings 34a, 34b in the manifold base 18. Then, the opposite ends of the supply passage 26 and the discharge passages 28a, 28b which extend through the valve body 22 in the direction in which the valve bodies 22 are arrayed are closed by plugs (not shown), and the second output ports $A_2$, $B_2$ are closed by the respective plugs 58.

A fluid under pressure is introduced from a pressure fluid supply (not shown) into the supply passage 50 in the manifold base 18, and then discharged from the discharge passages 52a, 52b through a communication passage that is defined in an end block (not shown) coupled to an end of the manifold base 18.

When the directional control valve 10 is in the second position (shown in FIG. 1), the fluid under pressure introduced into the supply passage 50 in the manifold base 18 flows through the supply passage 26, the valve hole 24, and the first output port $B_1$ in the valve body 22, and egresses from the output port 54a that is defined in the front surface of the manifold base 18.

Instead of the second output ports $A_2$, $B_2$, the first output ports $A_1$, $B_1$ may be closed by plugs to allow the fluid under pressure to be discharged from the second output ports $A_2$, $B_2$ in the valve body 22.

Next, another application in which the directional control valve 10 is directly mounted on the rail 20 will be described below.

As shown in FIG. 2, the blanking plate 36 is fastened to the attachments 38 in the valve body 22 by the attachment screws 56. The supply port P, the first output ports $A_1$, $B_1$, and the discharge ports EA, EB are all closed by an inner wall surface of the blanking plate 36 and the attachment screws 56. Then, the directional control valve 10 is directly mounted on the rail 20 by attachment members 62, 64 as shown in FIG. 3.

A fluid under pressure supplied from a pressure fluid supply (not shown) is introduced into the supply passage 26 in the valve body 20, and then discharged from the discharge passages 28a, 28b through a communication passage that is defined in an end block (not shown).

When the directional control valve 10 is in the second position (shown in FIG. 3), the fluid under pressure is outputted from the second output port $B_2$ defined in the upper surface of the valve body 22 through the valve body 24 that communicates with the supply passage 26. When the directional control valve 10 is in the first position, the fluid under pressure is outputted from the second output port $A_2$ defined in the upper surface of the valve body 22 through the valve body 24 that communicates with the supply passage 26.

According to the present invention, the same valve body 22 allows the directional control valve 10 to be installed on the manifold base 18 or directly installed on the rail 20. Therefore, the directional control valve 10 can be used in a variety of different modes of installation. Therefore, it is not necessary to have on hand various types of directional control valves having different structures for use in different modes of installation. The valve manufacturing cost is reduced and also the number of parts of the valve is reduced thereby to facilitate valve inventory control.

The directional control valve according to the present invention serves to control the direction of flow of a fluid under pressure, and can widely be used in a fluid pressure circuit, or a machine, a component, an apparatus or the like which utilizes a fluid pressure.

We claim:

1. A directional control valve comprising a supply port, an output port, a discharge port, a valve body having a valve hole communicating with the supply, output, and discharge ports, and a valve body displaceable in the valve body for controlling the direction of flow of a fluid under pressure, characterized in that:

said valve body has a supply passage and discharge passages extending therethrough in a direction in which directional control valves are arrayed, and first and second output ports communicating with said valve hole;

said supply port, said first output port, and said discharge port being defined in a first side surface of the valve body at positions for communication with corresponding openings in a manifold base for installing the directional control valve thereon, said supply port and said discharge ports being defined for communication with said supply passage and said discharge passage, respectively;

said second output port being defined in a second side surface of the valve body in opposite confronting relation to said first side surface thereof;

further comprising:

attachment means in said first side surface of the valve body for attaching a closure member for closing said supply port, said first output port, and said discharge port.

2. A directional control valve according to claim 1, wherein said attachment means comprises an internally threaded opening of said first output port.

3. A directional control valve according to claim 2, wherein said closure member comprises a blanking plate, said blanking plate having a size which can be mounted between the first side surface of the valve body and a rail for installing the directional control valve thereon, said blanking plate being detachably mounted on said valve body.

4. A directional control valve according to claim 3, wherein said blanking plate is mounted on the first side surface of the valve body, further comprising a pipe joint connected to said second output port defined in the second side surface of the valve body.

5. A directional control valve according to claim 1, wherein said closure member comprises a blanking plate, said blanking plate having a size which can be mounted between the first side surface of the valve body and a rail for installing the directional control valve thereon, said blanking plate being detachably mounted on said valve body.

6. A directional control valve according to claim 5, wherein said blanking plate is mounted on the first side surface of the valve body, further comprising a pipe joint connected to said second output port defined in the second side surface of the valve body.

7. A directional control valve according to claim 1, wherein said manifold base comprises an elongate unitary block.

8. A directional control valve according to claim 7, wherein said manifold base is coupled to the first side surface of the valve body, further comprising a closing plug mounted in said second output port defined in the second side surface of the valve body.

9. A directional control valve according to claim 1, wherein said manifold base comprises a plurality of separate blocks of substantially the same shape for alignment with respective directional control valves.

10. A directional control valve according to claim 9, wherein said manifold base is coupled to the first side surface of the valve body, further comprising a closing plug mounted in said second output port defined in the second side surface of the valve body.

* * * * *